United States Patent
Kibby

(10) Patent No.: US 8,513,315 B2
(45) Date of Patent: Aug. 20, 2013

(54) $CO_2$ INJECTION INTO SYNTHESIS FEED GAS TO REDUCE OR ELIMINATE NET $CO_2$ PRODUCTION DURING ISOSYNTHESIS OVER ZNO-$CR_2O_3$ PLUS ZSM-5 HYBRID CATALYST COMBINATIONS

(75) Inventor: Charles L. Kibby, Benicia, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 337 days.

(21) Appl. No.: 12/981,665

(22) Filed: Dec. 30, 2010

(65) Prior Publication Data

US 2011/0160316 A1    Jun. 30, 2011

Related U.S. Application Data

(60) Provisional application No. 61/291,272, filed on Dec. 30, 2009.

(51) Int. Cl.
   *C07C 27/00* (2006.01)
(52) U.S. Cl.
   USPC .......................................... 518/700; 518/714
(58) Field of Classification Search
   USPC ................................ 518/700, 714
   See application file for complete search history.

(56) References Cited

U.S. PATENT DOCUMENTS 4,011,275 A * 3/1977 Zahner ......................... 518/713

OTHER PUBLICATIONS

Bibao et al., syngas on Cr2O3-ZnO/ZSM-5 catalysts, Chemical engineering communication (1999), 174, 1-19.*
Kibby, C.L., Direct Isoparaffin and Aromatics Production in Synthesis Gas Conversion over Zinc Oxide-Chromia plus *2SM-5*. Experimental Design Study at ZEOSIT. Apr. 27, 2005 (project YWESR0290 I 04).
Direct Isoparaffin, Cycloparaffin and Aromatics Production in Synthesis Gas Conversion over a ZnCr-ZSM-5 Hybrid Catalyst. Experimental Design Study #2 at ZEOIST (Project YWESR0290401) Sep. 14, 2006.
Recycle and CO, Addition Effects on Net CO, and Hydrocarbon Production during Syngas Conversion over ZnCr + ZSM-5 Hybrid Catalysts. Design Study #3 at ZEOIST (Project YWESR029040I) Oct. 2007.
Activation Gas, Zeolite Acidity, Hydrogen Level and CO, Addition Effects on Hydrocarbon Production during Syngas Conversion over ZnCr + ZSM-5 Hybrid Catalysts. Design Study #4 at ZEOSIT (Project YWESR0290401) Mar. 10, 2008.

* cited by examiner

*Primary Examiner* — Jafar Parsa
(74) *Attorney, Agent, or Firm* — A. Stephen Zavell

(57) ABSTRACT

A process of form hydrocarbons boiling to the gasoline range and reducing or eliminating net $CO_2$ production during isosynthesis over a ZnO—$Cr_2O_3$ plus ZSM-5 catalyst by adding from about 5% to about 15% $CO_2$ to the synthesis gas mixture prior to contact to with catalyst.

17 Claims, 4 Drawing Sheets

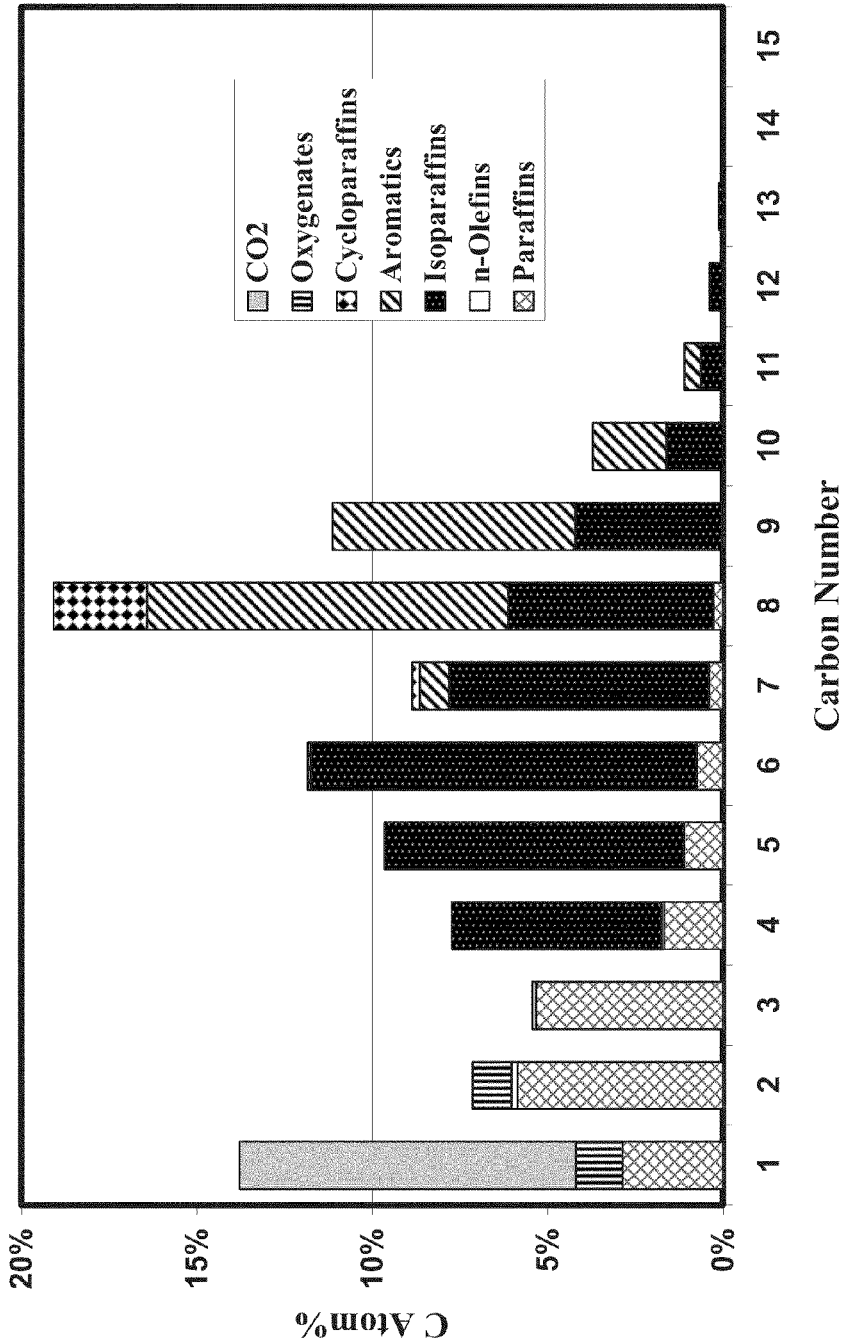

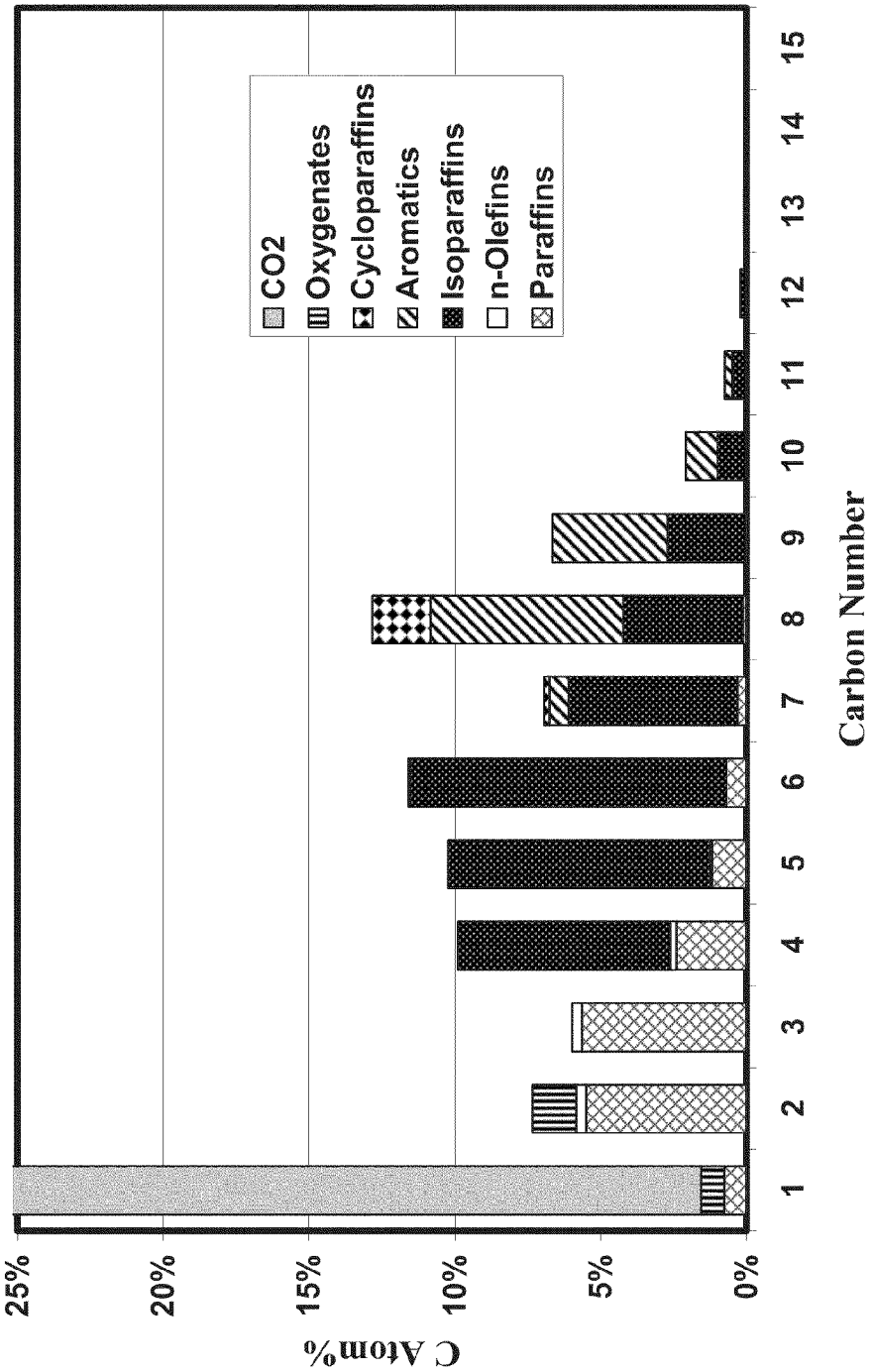

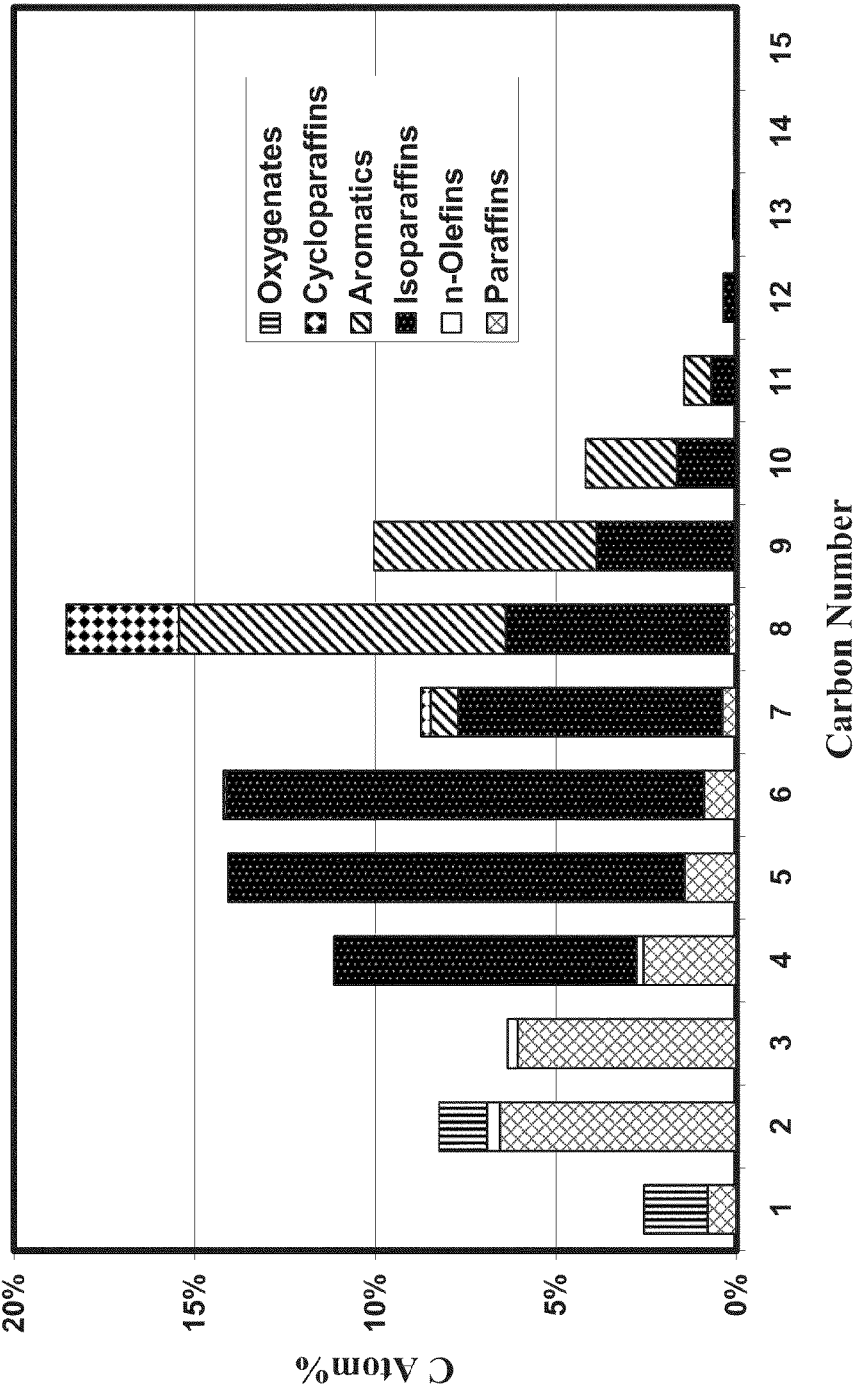

CO₂ INJECTION INTO SYNTHESIS FEED GAS TO REDUCE OR ELIMINATE NET CO₂ PRODUCTION DURING ISOSYNTHESIS OVER ZNO-CR₂O₃ PLUS ZSM-5 HYBRID CATALYST COMBINATIONS

This application claims the benefit of the filing date of the U.S. Provisional Application No. 61/291,272 filed on Dec. 30, 2009.

FIELD OF THE INVENTION

Catalysts and process for the conversion of methane to gasoline range hydrocarbons.

BACKGROUND OF THE INVENTION

Hybrid catalysts for conversion of methane through a synthesis gas pathway to gasoline-range hydrocarbons, (mainly isoparaffins) and LPG, comprising a ZnO—Cr₂O₃ methanol catalyst with a ZSM-5 type zeolite, have strong water gas shift activity. At high single pass conversions, the buildup of steam pressure causes conversion of CO to CO₂. Without control, this makes these "isosynthesis" catalysts unsuitable for GTL applications, where carbon is the limiting element and for carbon efficiency, it is necessary to reject the oxygen in the synthesis gas as water.

SUMMARY OF THE INVENTION

The problem is addressed by running in a "dry gas" recycle mode and returning a sufficient amount of CO₂ to the inlet of the reactor, or else introducing CO₂ from another source into the feed gas, so that the reverse water gas shift reaction is in balance with the forward water gas shift reaction and net production of CO₂ is avoided. The economics are most positive if the amount of recycle needed is not so high as to cause excessive compressor costs, and the dilution of reactant gases (CO and especially, H₂) by CO₂ does not unduly depress the methanol synthesis rates.

We have found conditions where a moderate recycle ratio (5:1) and inlet CO₂ content (5-10 vol %) lead to net CO₂ consumption at the same time that liquid hydrocarbon productivity is kept high (90 g C₅+ hydrocarbons/$L_{catalyst}$/h), thus addressing the CO₂ production problem.

Temperature and pressure ranges will depend on whether a straight through or a recycle operation mode is used. The broadest temperature is 320° C. to 400° C., a preferred temperature is 330° C. to 370° C. A most preferred temperature is 340° C. to 360° C. With recycle and removal of water in the recycle loop, operation at the higher temperatures and at higher conversion levels is feasible. Thus, a range of 380 to 400° C. is suitable with no significant aging of the methanol catalyst after 50-100 hours of operation. To make up for the less favorable methanol equilibrium at the higher temperature, a higher pressure (80 atm) is preferred.

A suitable pressure range is 10 to 100 atm, a preferred pressure range is 30 to 80 atm, a most preferred pressure is 40 to 60 atm. The reaction is equilibrium limited in methanol production, higher pressures enhance the synthesis rate. However, the methanol catalysts are water sensitive and, so high pressures and high conversions to hydrocarbons are not preferred for once-through operation, at least, at the beginning of start-up or early stages in the catalyst life. Higher pressured can be adopted in the later stages to maintain the activity level, and are suitable for recycle operation if most of the water is removed in the recycle loop.

Suitable operating parameters are 40 atm, 350° C. for start of run at a gas hourly space velocity (GHSV)=4000 h⁻¹ without recycle is suitable. At the start, as noted above, conversion must be kept low to prevent rapid catalyst aging from high product water pressures. With recycle and water removal in the recycle loop, the water pressure in the reactor is limited and higher conversion operation is feasible without undue catalyst aging. Thus, the feed GHSV can decline to 1000-2000 h⁻¹ for recycle operation.

A ($H_2$—$CO_2$)/(CO+$CO_2$) ratio of 2 is preferred, since that is the stoichiometric ratio for methanol synthesis. As CO₂ increases, the H₂/CO ratio becomes much greater than 2:1 for 5% CO₂, H₂/CO=2.56 and for 10% CO₂, the H₂/CO=3.5. Operation at higher ratios is feasible, resulting in lighter and more saturated products, but there will then be hydrogen left over which, if not recycled, reduces the economics of the process. High hydrogen pressure makes methanol formation more favorable, and is thus preferred when the methanol catalyst activity has declined, and/or for operation at lower pressures. Operation at a lower ($H_2$—$CO_2$)/(CO+$CO_2$) ratio than 2 is also feasible if heavier and more unsaturated products are desired, but there is a decrease in carbon efficiency.

Other methanol catalysts can benefit from CO₂ addition. For the zinc chromite methanol catalyst, added alumina and provide for a more active catalyst. Suitable Zn/Cr ratios are from 0.5 to 2.0. However, ratios as broad as 0.05 to 20 are active. The addition of copper helps activity, but at a cost of more methane, ethane, and LPG formation. The primary products on the zeolite are light olefins. Too strong a hydrogenation activity tends to saturate the olefins and paraffins.

More active methanol catalysts designed for operation at lower temperatures, such as the commercial copper-zinc oxide catalyst and supported palladium, will probably make too much methane and we know that the former ages rapidly at the temperatures required for the zeolite to function (above 320 C).

Apart from practicality, however, the methanol catalysts have similar reaction mechanisms and I don't think that any of the modifications will cause them to be poor water gas shift catalysts. If we could find one that would definitely merit a patent! Thus, they should all produce CO₂ when used as components of isosynthesis catalysts and all should show the same inhibition of net CO₂ production due to added CO₂ in the feed or to recycle of CO₂. Even if some may not last very long. Most are degraded by water and shifting the $H_2O$+CO=$CO_2$+$H_2$ equilibrium back toward $H_2O$ will make them even less stable.

BRIEF DESCRIPTION OF THE DRAWINGS

FIGS. 2 to 4 illustrate product distributions for reactors at 380° C., 80 atm, (H2-CO₂)/(CO+CO₂)=2 with an isosynthesis catalyst running in a fixed bed reactor and a dry recycle and at three conditions:

FIG. 2 high recycle ratio (20:1) with only H₂ and CO in the feed gas;

FIG. 3 has a low recycle ratio (5:1) with only H₂ and CO in the feed gas; and

FIG. 4 has a low recycle ratio (5:1) with 8 vol % CO₂ added to H₂ and CO in the feed gas.

DESCRIPTION OF PREFERRED EMBODIMENTS

Figure 1:
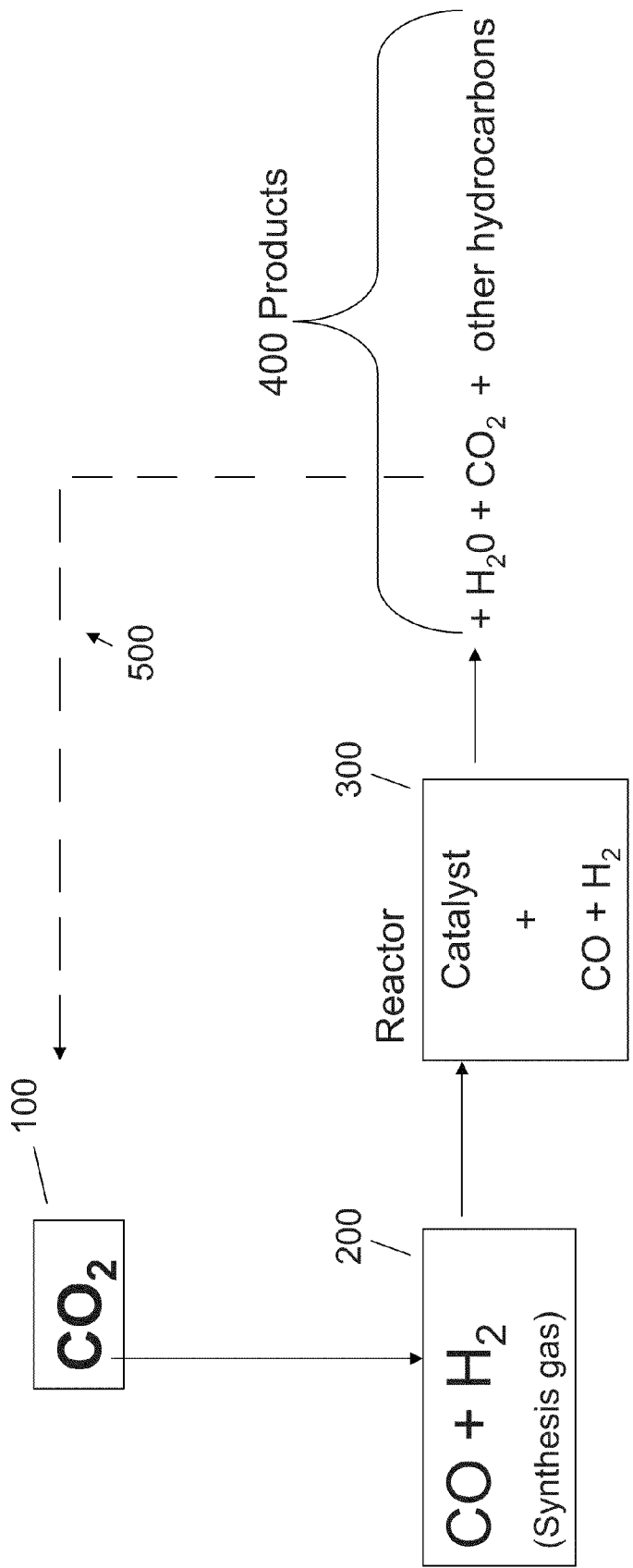
FIG. 1 is an illustrative process flow scheme with optional CO₂ recycle.

The process is illustrated in FIG. 1. Synthesis gas 200, from the reforming of CH₄, comprising CO+H₂ is sent to a reactor 300 which includes the methanol and ZSM-5 catalyst combination. The products 400 of the reaction are hydrocarbons boiling in the gasoline range with few hydrocarbons above the $C_{10}$ range plus $H_2O+CO_2$ and other hydrocarbon species such as olefins, aromatics etc. While carbon number (n) can vary from 1 to less than 15, the predominant components are where n is from 4 to 9 with less than 5% above 10. The $CO_2$ 100 is added to the synthesis gas 200 in an amount from 5 wt % to about 10 wt % of the gas mixture. After the initiation of the reaction, optimally the $CO_2$ 500 from the products 400 can be recycled to the synthesis gas 200 to maintain the appropriate level of $CO_2$ in the synthesis gas mixture.

A catalyst comprising a mixture of 70 wt % ZnO—$Cr_2O_3$+ 30 wt % moderately acidic i.e. The Brönsted acidities are 190-230 μmol/g, ZSM-5, running at 380° C. and 80 atm, with inlet GHSV=1780 $h^{-1}$ and dry gas recycle=9000 $h^{-1}$, converts $H_2/CO=2$ synthesis gas to about 122 g/L/h $C_5+$ hydrocarbons with 50-55% carbon selectivity to $C_5+$ and about 15% selectivity to LPG ($C_3+C_4$), but with about 20-25% selectivity (undesirable) to $CO_2$.

The commercial, "normal" ZSM-5 samples from tend to have bulk Si/Al ratios of between 12-40 and $SiO_2/Al_2O_3$ ration of between 23-80, since the lattice Si/Al (by IR) is much higher, about 60 for the sample with bulk Si/Al=40. Thus, much of the aluminum is "extralattice" material.

"Low acidity" samples made from the "normal" ZSM-5's have bulk Si/Al ratios between 50-100 and SiO2/Al2O3 ratios between 100-200 and lattice Si/Al ratios between 200-350. Their Brönsted acidities are 35-50 μmol/g.

A high acidity ZSM-5 as have SiO2/Al2O3 ratios between 27 and Si/Al ratio of 13.5. This sample is then equivalent to the most acidic Zeolyst commercial samples available these acidic catalysts have almost twice the Al content of the usual Zeolyst ZSM-5 that we have been using. Zeosit's "moderately acidic" form has SiO2/Al2O3=70 (Si/Al=35) and is in the "normal" range for Zeolyst samples (25-45). Its Si/Al is actually lower than the "normal" one we've been using at hte—meaning that it is probably more acidic.

With 8 vol % CO2 added to the feed gasses, so that the synthesis gas composition corresponds to (H2-$CO_2$)/(CO+ $CO_2$)=2, but with all other conditions (catalyst, temperature, pressure, and space velocities) the same, synthesis gas conversion to hydrocarbons decreases to 105 g/L/h C5+, and the selectivity for C5+ increased to 70-72%. The LPG also increased to 18%. There was no net CO2 formation. Rather, there was also a small conversion of the added CO2 to hydrocarbons.

It is surprising that with 5% to 15% $CO_2$, preferably about 8% $CO_2$, such addition did not adversely affect the stability of the methanol catalyst, and it caused only a minor decrease in the $C_5+$ productivity (with a favorable large increase in fuel selectivity). The water vapor pressure increased significantly upon suppression of the water gas shift reaction, and water is known to cause aging of methanol catalysts.

The invention addresses the potential for controlling $CO_2$ production in this system through recycle of $CO_2$-containing tail gas. This is counter intuitive to add $CO_2$ to favorably handle the water-gas-shift over these catalysts. This extends the uses of these catalysts which are otherwise only useful for biomass (BTL) or coal (CTL) conversion, where the intermediate synthesis gas is hydrogen deficient and shifting of $CO+H_2O$ to $CO_2+H_2$ is required.

Hydrocarbon products from this system are mainly LPG and high-octane gasoline. Methane selectivity is quite low, but selectivity to ethane is sometimes significant. Since the majority of the liquid products are isoparaffins, the process is viewed as an "isosynthesis" process.

Several experiments were performed in a fixed-bed, recycle reactor at a pressure of 80 atm and a center-of-bed temperature of 380° C., using 27 cc catalyst charges. Recycle ratios were 5:1 or 20:1 with inlet feed rates of 1000-2000 $cc/g_{catalyst}$/h. The inlet feed was either pure synthesis gas with $H_2/CO=2$ or synthesis gas blended with $CO_2$ so that the ratio ($H_2$—$CO_2$)/($CO+CO_2$) was also close to 2. Measured responses were $H_2$, CO, and $CO_2$ conversion rates, selectivities to various hydrocarbon types, and carbon number distributions among those types, including n-paraffins, isoparaffins, aromatics, naphthenes (cycloparaffins), and olefins (PIANO analysis).

| | |
|---|---|
| Inlet $CO_2$ content (per CO) | 0.0 or 0.4 (8 vol %) |
| Wt % ZSM-5 | 30% |
| ZSM-5 Si/Al Ratio | 35 |
| Recycle Ratio (vol. recycle/vol. feed) | 5 or 20 |
| Inlet GHSV ($h^{-1}$) | 1100-1800 |

The conversion and product distribution data was recorded after the catalysts had been on stream for six hours at the nominal $H_2/CO$ ratio, inlet flow, and recycle flow for each run. Constant conditions were maintained for at least another 48 hours and the product was sampled every four hours during that period. Water and hydrocarbons that condensed at room temperature were removed from the recycle stream during each pass.

There is often a rapid shift in the product distribution during start-up and the early few days of operations. Production of cycloparaffins and aromatics decreased, while production of isoparaffins increased and the product distributions became slightly heavier. "Lined-out" conversion rates and product distributions were calculated as the averages of values determined between 34 hours on stream and 54 hours on stream (i.e., at an average run time of 44 hours).

At these run conditions, $C_5+$ hydrocarbon production rates without $CO_2$ addition were 120-130 $g/L_{catalyst}$/h at $C_5+$ selectivities of 50-70%. Methane selectivity was low, accounting for only 2%-3% of the converted CO. In addition to hydrocarbons, small amounts of methanol and dimethylether ((1%-3%) were produced. These could be further converted to hydrocarbons with a small bed of ZSM-5, so the reported fuel selectivities can be increased by their amount (1%-3%).

Amounts of CO converted to $CO_2$ were about 10% of CO converted which is moderate at 20:1 recycle. The low average partial pressure of water in the catalyst bed had an effect on this conversion. Appreciable amounts of $CO_2$ (about 25% of CO converted) were produced at 5:1 recycle ratio. With 8 vol % $CO_2$ added to the feed gas at the lower recycle ratio, such that ($H_2$—$CO_2$)/($CO+CO_2$) ration of 2 and the inlet gas $H_2/CO$ ration of 3.1, there was net consumption of $CO_2$. The rate of $CO_2$ consumption under these conditions was about one-third the rate that $CO_2$ was produced when it wasn't present in the feed gas.

Thus, $CO_2$ consumption/production should be neutral with about 6-7 vol % $CO_2$ in the feed gas at a recycle ratio of 5.

With greater amounts of $CO_2$ in the feed, the recycle ratio could be lowered even further before $CO_2$ production commenced. Thus, the invention permits the control net $CO_2$ production in this system at commercially useful recycle ratios.

The recycle ratio impacts the methane production rates and is significantly higher at the higher recycle ratio. Liquid production rates were slightly higher, and $C_3$-$C_4$ rates were lower (See Table 2 hereinafter). The major effect was a greatly decreased rate of $CO_2$ production, due to the decreased water vapor pressure. Among the liquid hydrocarbons, aromatics production was favored by a higher recycle ratio, while formation of isoparaffins was inhibited slightly.

Adding $CO_2$ in accordance with the invention to the feed at moderate recycle ratio caused a large decrease in $CO_2$ production. At the $CO_2$ levels in the Examples, there was actually a net conversion of $CO_2$ to hydrocarbons (see the data in Table 2 below). However, since addition of $CO_2$ lowered the reactant pressures, it also caused a decrease in the hydrocarbon production rate. As for increased recycle rate, the selectivity among the hydrocarbons shifted to less $C_3$-$C_4$ (LPG) and more $C_5$+ liquids when $CO_2$ was added.

The benefits of the invention are exemplified in part as follows:

During synthesis gas conversion, 50%-90% of the product from composite catalysts containing ZnO—$Cr_2O_3$ and acidic ZSM-5 is $C_5$-$C_{12}$ isoparaffins, $C_7$-$C_{10}$ aromatics, or $C_7$-$C_{10}$ cycloparafins at 40-80 atm, 350-400° C., and $H_2$/CO=1.0-2.2. The highest selectivities to $C_5$+ liquids were obtained with single-layer, mixed catalyst systems in which both components were present in each catalyst particle.

Methane plus carbon dioxide selectivity was only 4%-12% over mixed catalyst beds in a recycle reactor with a high recycle rate upwards of $25000^{h-1}$ gHSV, where condensation of water and hydrocarbon liquids in the recycle stream keep reactant pressures high and inhibit the water-gas shift reaction.

The remainder of the hydrocarbon product is $C_2$-$C_4$ alkanes and $C_1$-$C_7$ n-paraffins. Only traces of olefins are formed. Without a cleanup bed of ZSM-5, a few percent of the carbon monoxide is also converted to methanol and dimethylether (more so at longer times on stream, indicating a slow deactivation of the zeolite).

Over mixed ZnO—$Cr_2O_3$+ ZSM-5 catalysts activated in synthesis gas, aromatics and cycloparaffins initially make up as much as half of the hydrocarbon product; isoparaffins make up about one-quarter. As the zeolite ages, these fractions shift until they reverse. At 40-60 hours on stream, the major products are $C_4$+ isoparaffins. $C_2$-$C_4$ and liquid n-paraffin selectivities remain fairly constant with time on stream.

Isoparaffin yields are favored over aromatics by higher $H_2$/CO ratios and by higher pressures, but the overall $C_5$+ selectivity is best at low $H_2$/CO ratios. Increasing the $H_2$/CO ratio decreases $CO_2$ production, undoubtedly due to its effect on the water gas shift equilibrium.

For mixed catalyst systems, small increases in temperature cause significant increases in the hydrocarbon synthesis rate at the low end of the range claimed here (320° C. to 350° C. or so). The selectivity to methane increases slightly at higher temperature, and the selectivity to liquid hydrocarbons ($C_5$+) decreases slightly. Equilibrium constraints cause the temperature response to become minimal at the high end of the temperature range, 370° C. to 400° C., unless the pressure is very high (>80 atm) and long-term stability of the ZnCr methanol catalyst becomes poor at those temperatures.

Each catalysis run was performed in a fixed-bed, high-pressure, gas recycle apparatus capable of operation at pressures up to 100 atm at 400° C. Condensers in the recycle loop removed $C_{3+}$ hydrocarbons, methanol, DME, and water. The recycle flow was high compared to the inlet flow ($GHSV_{recycle}$=9000-24,000 $h^{-1}$ versus $GHSV_{inlet}$=1200-1780 $h^{-1}$). The catalyst bed size was 27 $cm^3$.

The ZSM-5 catalyst was a commercial sample from JDC STC Zeosit, with a molar $SiO_2/Al_2O_3$ ratio of 70 (Si/Al=35, 1.26 wt % Al). The methanol synthesis catalyst was also manufactured by Zeosit. Its composition was 4ZnO: $1Cr_2O_3$ (Zn/Cr=2).

The most preferred catalyst composition is Zn/Cr ratio of 1, made at pH 7. However, ratios of Zn/Cr from 0.5 to 2 and precipitation pH's from 4.5 to 9.5 also are suitable in the invention.

Catalysts were prepared from the zeolite and methanol catalyst components by mixing the component powders (particle size <50 μm), tableting the mixture, then crushing and sieving the tablets to 0.25-0.50 mm granules. The ZSM-5 catalyst was used in its acid form and the zinc oxide-chromia catalyst was pre-reduced in hydrogen. The weight ratio of ZnO—$Cr_2O_3$ to ZSM-5 was 70:30, which produced approximately equal volumes of the two components.

Before each synthesis gas conversion test, catalysts were heated at atmospheric pressure from 20° C. to approximately 380° C. at 2-3° C./min in synthesis gas at $H_2$/CO=2.0 and activated at that temperature for two hours as the pressure was then raised to 80 atm. Most of the gas flow was recycled through the reactor after passing a high-pressure condenser, which knocked out water, methanol, DME, and liquid hydrocarbons. The results of testing at 80 atm and 380° C. over the first 6 hours after the activation were used to evaluate the catalysts' initial activities, but they were not included in evaluations of product selectivities. Gas and liquid samples were taken at 4 hour intervals from 10 hours on stream to at least 54 hours on stream.

All process conditions were held constant for the duration of each run. Carbon number distributions for hydrocarbon products were determined through $C_{14}$. No significant amounts of $C_{15}$+ material were detected. For the $C_4$+ fraction, the aliphatic products were divided into n-paraffin, isoparaffin, and olefin components. Only traces of $C_5$+ olefins and small amounts of n-paraffins were detected; most of the aliphatic liquids were isoparaffins. Aromatics distributions were divided into $C_6$, $C_7$, $C_8$, $C_9$, and $C_{10}$+ fractions. Hardly any $C_{11}$+ aromatics were formed, in accord with the pore size of ZSM-5 that makes it difficult to form pentamethylbenzene or hexamethylbenzene.

$C_6$-$C_8$ cycloparaffins were also formed during each run, but at levels five times lower than those of the corresponding aromatics. With long times on stream, selectivity to cycloparaffins improves at the expense of aromatics, but that wasn't seen in these brief runs. Data were also obtained for the amounts of oxygenates produced ($H_2O$, $CO_2$, methanol, and dimethyl ether).

The major products over the ZnO—$Cr_2O_3$+ ZSM-5 hybrid catalyst systems were the following hydrocarbons, in addition to $CO_2$ and small amounts of methanol and dimethylether:

$C_1$-$C_7$ n-alkanes, maximum at $C_3$
$C_4$-$C_{14}$ isoparaffins, maximum at $C_6$
$C_6$-$C_8$ cycloparaffins, mainly methylcyclohexanes, maximum at $C_8$
$C_7$-$C_{10}$ aromatics, mainly methylcyclohexanes, maximum at $C_8$ The average carbon number was about 6 in a typical run. Selectivities to the hydrocarbons, based on CO converted, ranged from 45% to over 100%. The high values were for runs with $CO_2$ added, in which much of the $CO_2$ was also converted to hydrocarbons. Carbon, hydrogen, and oxygen balances were all closed to within ±5%.

Product distributions over composite catalysts activated in synthesis gas changed markedly in the first day of operation. Aromatics selectivity declined, but was largely balanced by a corresponding increase in isoparaffin yield; everything else was relatively constant. To estimate "lined out" selectivities, values between 34 hours and 54 hours on stream were averaged (six samples at 4-hour intervals).

Table 1 lists lined out selectivities to various products for three cases—high recycle ratio without $CO_2$ addition, moderate recycle ratio without CO2 addition, and moderate recycle ratio with 8 vol % $CO_2$ added to the syngas feed. Table 2 list the corresponding rates of formation for those three cases. They are given in units of standard cc (0° C., 1 atm) of CO converted to the given product per cc of catalyst per hour. Thus, they are proportional to the molar percentages of carbon in the products that are listed in Table 1. For the hydrocarbon products, these percentages are close to the weight percentages.

TABLE 1

Isosynthesis over Hybrid $ZnO$—$Cr_2O_3$/ZSM-5 Catalyst.
Selectivities to Hydrocarbon Products and $CO_2$.
Catalyst = 70 wt % $ZnO$—$Cr_2O_3$ (Zn/Cr = 2) and 30 wt % ZSM-5 (Si/Al = 35)

|  | Example 1 Fast Recycle | | Example 2 Slow Recycle | | Example 3 Slow Recycle | |
| --- | --- | --- | --- | --- | --- | --- |
| $CO_2$ in Feed, vol % | 0 | | 0 | | 8% | |
| Temperature, ° C. | 380 | | 380 | | 380 | |
| Pressure, atm | 80 | | 80 | | 80 | |
| $GHSV_{recycle}$, $h^{-1}$ | 24000 | | 9000 | | 9000 | |
| $GHSV_{feed}$, $h^{-1}$ | 1130 | | 1780 | | 1780 | |
| Recycle Ratio | 20 | | 5 | | 5 | |
| Carbon % in product | including $CO_2$ | excluding $CO_2$ | including $CO_2$ | excluding $CO_2$ | including $CO_2$ | excluding $CO_2$ |
| $CO_2$ | 10% | | 24% | | none | |
| Oxygenates | 2% | | 2% | | 3% | |
| $C_1$ – $C_2$ | 9% | 10% | 7% | 9% | 8% | 8% |
| $C_3$ + $C_4$ | 13% | 15% | 16% | 21% | 17% | 17% |
| $C_5+$ | 66% | 73% | 51% | 67% | 72% | 72% |
| $C_3+$ | 79% | | 67% | | 89% | |
| $C_5+$ Isoparaffins | 40% | 45% | 34% | 46% | 42% | 42% |
| $C_5+$ n-Paraffins | 3% | 3% | 2% | 3% | 3% | 3% |
| Aromatics | 21% | 24% | 13% | 17% | 18% | 18% |
| Cycloparaffins | 3% | 3% | 2% | 3% | 3% | 3% |

TABLE 2

Isosynthesis Rates over Hybrid $ZnO$—$Cr_2O_3$ plus ZSM-5
Catalyst. Effects of Recycle Ratio and Added $CO_2$.
Catalyst = 70 wt % $ZnO$—$Cr_2O_3$ (Zn/Cr = 2) and 30 wt % ZSM-5 (Si/Al = 35)

|  | Example 1 Fast Recycle | | Example 2 Slow Recycle | | Example 3 Slow Recycle | |
| --- | --- | --- | --- | --- | --- | --- |
| $CO_2$ in Feed, vol % | 0 | | 0 | | 8% | |
| Temperature, ° C. | 380 | | 380 | | 380 | |
| Pressure, atm | 80 | | 80 | | 80 | |
| $GHSV_{recycle}$, $h^{-1}$ | 24000 | | 9000 | | 9000 | |
| $GHSV_{feed}$, $h^{-1}$ | 1130 | | 1780 | | 1780 | |
| Recycle Ratio | 20 | | 5 | | 5 | |
| Rate, $cc_{CO\ converted\ to\ product}/cc_{catalyst}$/h: | | | | | | |
| $CH_4$ | 8.7 | 2.9% | 2.8 | 0.8% | 1.8 | 0.8% |
| $C_2$ | 18.3 | 6.0% | 21.9 | 5.8% | 15.9 | 6.9% |
| $C_3$ | 16.5 | 5.4% | 22.4 | 6.0% | 14.6 | 6.3% |
| $C_4$ | 23.4 | 7.7% | 37.1 | 9.9% | 25.7 | 11.1% |
| $C_5+$ Isoparaffins | 120.5 | 39.8% | 128.4 | 34.3% | 106.0 | 46.0% |
| $C_5+$ n-Paraffins | 7.8 | 2.6% | 8.9 | 2.4% | 6.9 | 3.0% |
| Aromatics | 62.7 | 20.7% | 47.4 | 12.7% | 44.7 | 19.4% |
| Cycloparaffins | 8.8 | 2.9% | 8.3 | 2.2% | 7.8 | 3.4% |
| $CH_3OH$ | 4.0 | 1.3% | 3.0 | 0.8% | 4.0 | 1.8% |
| DME | 3.3 | 1.1% | 5.7 | 1.5% | 3.1 | 1.4% |
| $CO_2$ | 29.0 | 9.6% | 89.0 | 23.7% | −21.4 | −9.3% |
| CO | −303.0 | | −374.8 | | −209.6 | |
| Rate, $mg_{product}/cc_{catalyst}$/h: | | | | | | |
| $C_5+$ | 127 | | 122 | | 105 | |

$C_5+$ synthesis rates were about 127 g/L/h at the 20:1 recycle ratio, compared with 122 g/L/h at a 5:1 ratio. This small decline is undoubtedly due to lower average $H_2$ and CO pressures when less water is removed from the recycle stream and the amount of both water and $CO_2$ build up with less recycle. The liquid hydrocarbon rate declined even further at the lower recycle ratio, to 105 g/L/h, when 8 vol % $CO_2$ was added to the feed. Again, the lower rates and liquid selectivities with added $CO_2$ are most likely due to dilution by the added $CO_2$ and by unshifted water.

Selectivity to $C_5+$ liquid hydrocarbons remained constant at about 65% at the high recycle ratio, but was considerably lower (about 50%) at the lower recycle ratio. This change with recycle ratio is mainly due to a much higher conversion to $CO_2$ when water isn't removed effectively. The selectivity increased from 50% to >70% when $CO_2$ was added at the slower recycle ratio, mainly due to the suppression of CO2 formation.

Selectivities to methane and $CO_2$ were quite low in the fast recycle mode. Methane accounted for about 3% and $CO_2$ about 9% of the CO converted at 380° C., 80 atm, and 44 hours on stream. At a moderate recycle ratio of 5:1, methane selectivity declined to only 1%, but $CO_2$ selectivity increased to about 24%. Adding $CO_2$ to the feed gas had little effect on the methane selectivity, but at 8 vol % it completely suppressed any net production of $CO_2$ and was partially converted to hydrocarbons itself.

Selectivity to $C_2$-$C_4$ (ethane, propane, isobutane and n-butane) averaged about 20% at high recycle. Light olefin production was negligible in these experiments. Selectivity to $C_2$-$C_4$ increased to about 22% at the lower recycle ratio and increased to 24% when 8 vol % $CO_2$ was then added to the feed. Most of the change was in the C4 fraction.

2.5-3.0% of the converted CO went to n-paraffins in the $C_5+$ range at all three conditions and a similar amount went into cycloparaffins. Aromatics selectivities were very low, about 13% of CO converted, at the slow recycle ratio, but increased to about 20% when either the recycle flow was increased or when $CO_2$ was added. C5+ isoparaffins accounted for about 35% of the CO conversion at slow recycle, increased to about 40% at fast recycle, and increased to 45% at slow recycle with added CO2. Carbon number distributions ranged from $C_1$ to $C_{14}$. They peaked at $C_6$ and $C_8$, with an average carbon number a little above $C_6$.

Virtually no olefins were produced during isosynthesis at 80 atm. The lightest of the hydrocarbons were the n-paraffins, mainly ethane and propane. Isoparaffins made up the largest hydrocarbon fraction, peaking at $C_5$ and $C_6$ but also with significant amounts of isobutane and $C_7+$ isoparaffins. Cycloparaffins (naphthenes) were concentrated at $C_7$ and $C_8$. The most abundant aromatics were xylenes (C8) and trimethylbenzenes (C9), but with significant amounts of toluene and durene ($C_{10}$).

$CO_2$ addition had a slightly negative impact on the CO conversion rate, but at 8 vol % it increased the $C_5+$ selectivity in the hydrocarbons and some $CO_2$ was also converted to hydrocarbons. Thus, the total $C_5+$ product rates were only slightly smaller.

Preferred conditions for isosynthesis over mixed beds of ZSM-5 zeolite and ZnO—$Cr_2O_3$ methanol catalyst are a high rate of dry gas recycle (20:1) and addition of enough $CO_2$ to the feed (or recycle of enough $CO_2$) so that net $CO_2$ production is zero. At those conditions, high conversions are possible with minimal production of either methane or $CO_2$.

Injection of $CO_2$ with the synthesis gas, directly or with recycling, permits using isosynthesis for remote gas conversion. While synthesis activity is decreased slightly by the added $CO_2$, reaction rates are still respectable and the main by-product is LPG (propane, butane, isobulane).

While the invention has been described in detail and with references to specific embodiments thereof, it will be apparent to one skilled in the art that various changes and modifications can be made without departing from the spirit and scope thereof.

What is claimed is:

1. A process for the production of hydrocarbons in the gasoline range from synthesis gas comprising, passing a mixture of CO and $H_2$ over catalytic mixture of from about 50 wt % to about 80 wt % ZnO—$Cr_2O_3$ and from about 20 wt % to about 50 wt % ZSM-5 at a GHSV from about 1000 $h^{-1}$ to about 4150 $h^{-1}$ with a gas recycle of from about 0% to about 25% wherein the synthesis gas composition included from about 5 wt % to about 10 wt % $CO_2$ to form hydrocarbons boiling in the gasoline range.

2. The process according to claim 1 wherein the $CO_2$ to about 8 wt %.

3. The process according to claim 2 wherein the catalyst mixture is about 70 wt % ZnO—$Cr_2O_3$ and about 30 wt % ZSM-5.

4. The process according to claim 1 where the hydrocarbons are in the $C_4$-$C_9$ range with less than 3% of the hydrocarbons above the $C_{10}$ range and less than 20% of the hydrocarbons are below the $C_4$ range.

5. The process according the claim 1 wherein the recycle ratio is from about 20:1 to 5:1.

6. The process according to claim 1 wherein the $CO_2$ is added to the synthesis gas mixture prior to passing over the catalyst.

7. The process according to claim 1 wherein the ZSM-5 is 30 wt % and the rest is ZnO—$Cr_2O_3$ with a recycle ratio of about 20:1.

8. In a process of converting synthesis gas to hydrocarbons boiling in the gasoline range with less than 5% boiling above the gasoline range over a combined methanol and ZSM-5 catalyst combination, the improvement which comprises adding from 5 wt % to 10 wt % of $CO_2$ to the synthesis gas mixture prior to contact with the methanol/ZSM-5 catalyst combination.

9. The process according to claim 8 wherein the $CO_2$ is 8 vol %±1 vol %.

10. The process according the claim 9 wherein the $CO_2$ is separated from the products of the reaction and recycled to the synthesis gas mixture.

11. The process according the claim 8 wherein the recycle ratio is from about 20:1 to 5:1.

12. The process according to claim 8 where the hydrocarbons are in the $C_4$-$C_9$ range with less than 3% of the hydrocarbons above the $C_{10}$ range and less than 20% of the hydrocarbons are below the $C_4$ range.

13. The process according to claim 8 wherein the ZSM-5 is 30 wt % and the rest is ZnO—$Cr_2O_3$ with a recycle ration of about 20:1.

14. The process according to claim 1 wherein the carbon number distribution peaks at $C_6$.

15. The process according to claim 8 wherein the carbon number distribution peaks at $C_6$.

16. The process according to claim 1 wherein the recycle ratio is 5:1.

17. The process according to claim 8 wherein the recycle ratio is 5:1.

* * * * *